US007245300B2

(12) United States Patent
Venkataraman

(10) Patent No.: US 7,245,300 B2
(45) Date of Patent: Jul. 17, 2007

(54) ARCHITECTURE FOR REAL-TIME TEXTURE LOOK-UP'S FOR VOLUME RENDERING

(75) Inventor: Kartik Venkataraman, San Jose, CA (US)

(73) Assignee: Micron Technology, Inc., Boise, ID (US)

(*) Notice: Subject to any disclaimer, the term of this patent is extended or adjusted under 35 U.S.C. 154(b) by 161 days.

(21) Appl. No.: 10/906,242

(22) Filed: Feb. 10, 2005

(65) Prior Publication Data

US 2005/0122324 A1 Jun. 9, 2005

Related U.S. Application Data

(63) Continuation of application No. 09/810,654, filed on Mar. 15, 2001, now Pat. No. 6,876,361.

(51) Int. Cl.
*G06T 17/00* (2006.01)
(52) U.S. Cl. .............. 345/424; 345/424; 345/428; 345/581; 345/582; 345/583; 345/589; 345/600; 345/601; 345/602; 345/606; 345/608
(58) Field of Classification Search ........ 345/424, 345/581, 582, 583, 589, 600, 601, 602, 606, 345/608, 428
See application file for complete search history.

(56) References Cited

U.S. PATENT DOCUMENTS 5,630,034 A 5/1997 Oikawa et al.
5,886,701 A 3/1999 Chauvin et al.
6,509,905 B2 1/2003 Hochmuth et al.

OTHER PUBLICATIONS

Lieberman, D., Volume-rendering PCI board casts rays in real-time, Electronic Engineering EE Times, Jul. 5, 1999, CMP Media Inc., Manhasset, NY.
Pfister, H., Architectures for Real-Time Volume Rendering, Elsesvier Preprint, Aug. 7, 1998, pp. 1-15, Mitsubishi Electric Research, Cambridge, MA.

(Continued)

*Primary Examiner*—Kimbinh T. Nguyen
(74) *Attorney, Agent, or Firm*—Jones Day; Edward L. Pencoske

(57) ABSTRACT

A slice plane, oriented parallel to a viewing plane, is passed through a cuboidal dataset at regular intervals. The intersection of the slice plane with the cuboidal volume dataset results in primitives (quads, triangles, etc. depending on the angle and position of the intersection) whose vertices have position coordinates ($x_u$, $y_u$, $z_u$) and 3D-texture coordinates (r, s, t). The resulting primitives are rasterized using, for example, a traditional 3D graphics pipeline wherein the 3D-texture coordinates are interpolated across the scanlines producing 3D-texture coordinates for each fragment. The resulting 3D-texture coordinates for each fragment are stored in a 2D-texture storage area. These 2D-textures are called density-textures. By preprocessing the cuboidal dataset, the rendering process becomes a compositing process. A rendering process is comprised of looking-up, for each densel in the texture, the corresponding color and opacity values in the current lookup-table. A user-specified compositing function is used to blend the values with those in the framebuffer to arrive at the final result. The final result, i.e. the values in the framebuffer, is displayed.

23 Claims, 2 Drawing Sheets

OTHER PUBLICATIONS

Levoy, M., Efficient Ray Tracing of Volume Data, ACM Transactions on Graphics, vol. 9, No. 3, Jul. 1990, pp. 245-261, University of North Carolina.

Levoy, M., Display of Surfaces from Volume Data, Volume Rendering, IEEE Computer Graphics & Applications, pp. 29-37, May, 1988, University of North Carolina.

Kajiya, J., The Rendering Equation, Siggraph '86, Aug. 18-22, pp. 143-150, vol. 20, No. 4, 1986, Dallas, TX.

Drebin, R. et al., Volume Rendering, Computer Graphics, vol. 22, No. 4, Aug. 1988, pp. 65-74, Siggraph 88, Atlanta, GA.

Pfister, H. et al., The VolumePro Real-Time Ray-Casting System, Siggraph 99, pp. 251-260, Los Angeles, CA.

Sato, Y. et al., Tissue Classification Based on 3D Local Intensity Structures for Volume Rendering, IEEE Transactions on Visualization and Computer Graphics, vol. 6, No. 2, Apr.-Jun. 2000, pp. 160-179.

Compositing Theory, Chapter Sixteen, Sep. 1994, pp. 179-190.

Compositing Practice, Chapater Seventeen, Nov. 1994, pp. 190-203.

Foster, N. et al., Modeling the Motion of a Hot, Turbulent Gas, pp. 1-18, Center for Human Modeling and Simulation, Univ. of Pennsylvania, Philadelphia, PA Cabral, B. et al., Accelerated Volume Rendering and Tomographic Reconstruction Using Texture Mapping Hardware, 7 pg., Silicon Graphics Computer Systems, Mountain View. CA OpenGL Architecture Review Board, Open GL Reference Manual:The Official Reference Document for OpenGL, Release 1, 1992, Silicon Graphics, Inc., Chapter 2

H. Pfister, Architectures for real-time volume rendering, Elsevier Science B.V., pp. 1-9, 1999.

ARCHITECTURE FOR REAL-TIME TEXTURE LOOK-UP'S FOR VOLUME RENDERING

The present disclosure is a continuation of U.S. patent application Ser. No. 09/810,654 entitled Architecture for Real-Time Texture Look-Up's for Volume Rendering filed Mar. 15, 2001, now U.S. Pat. No. 6,876,361.

BACKGROUND OF THE INVENTION

1. Field of the Invention

The present invention is directed to visualization methods and, more particularly, to volume-rendering techniques.

2. Description of the Background

The increasing availability of powerful workstations has fueled the development of new methods for visualizing or rendering volumetric datasets. Volumetric datasets are scalar or vector density fields defined over a 3D grid. The individual scalar values at each grid point is called a voxel. Typically, volumetric datasets are available from many different sources such as:

medical scanners such as magnetic resonance imagers (MRI) and computed tomography (CT);

sound spectrum analyzers which may produce seismic data;

laser strip triagulators which may produce height field data; and fluid dynamics data from discretization of 3D Navier-Stokes' partial-differential equations describing fluid flow.

Astrophysical, meteorological and geophysical measurements, and computer simulations using finite element models of stress, fluid flow, etc., also quite naturally generate a volumetric dataset. Given the current advances in imaging devices and computer processing power, more and more applications will generate volumetric datasets in the future. Unfortunately, it is difficult to see the 3-dimensional structure of the interior of volumes by viewing individual slices. To effectively visualize volumes, it is important to be able to image the volumes from different view points.

There are a number of visualizations methods which fall under the category of volume-rendering techniques. In certain of these techniques, a color and an opacity are assigned to each voxel, and a 2D projection of the resulting colored semitransparent volume is computed. One of the advantages of volume rendering is that operations such as cutting, slicing, or tearing, while challenging for surface based models, can be performed easily with a volumetric representation. While slicing is possible on traditional 3D models, the lack of any information on the internal structure means that no new information is to be had by slicing and viewing the internals. Another drawback of these techniques is their computational cost. Because all voxels participate in the generation of each image, rendering time grows linearly with the size of the dataset. As a result, real-time imaging becomes problematic with large datasets.

Real-time interactivity, however, is crucial for volumetric rendering. One requirement of volume rendering applications is the need to classify the volume into sub-regions each representing homogenous density values. In medical imaging, that ensures that anatomically different regions are rendered distinctly from one another. For example, classification enables a surgeon to separate, without ambiguity, nerve endings from the surrounding soft-tissue or the white matter from the gray matter in an image of the human brain. In geophysics and mining, it ensures that rock strata of incrementally different densities are clearly delineated in the rendering process. And in archaeology, it enables the archaeologist to easily resolve small density differences such as between fossilized bone and attached rock matrix.

Color and opacity texture lookup tables are central to classification. That allows the user to define isodensity regions of the volume dataset to be mapped to the same color and opacity. However, oftentimes anatomically distinct regions are not entirely homogeneous. Typically, an anatomically distinct region of the volumetric dataset will occupy a range of density values. The problem is to identify this range accurately. While statistical methods that assign the opacity and color to a voxel based on the probability that a particular tissue component is present in a tissue are available to ensure that classification can be done with a quantifiable degree of accuracy, methods of classifications based on visually interactive means present the user with a quick way of deriving acceptable results. Even sophisticated methods of classification based on multispectral and multi-channel data ultimately fine tune the classification by having the user guide the assignment of the opacity functions based on visual feedback.

Human perceptual studies have shown that the human eye is sharply sensitive to intensity changes in visual images. The need exists to enable quick visual updates of volume rendered images, preferably without a time-lag, when the user defines updates to the color and opacity lookup tables. Such an ability would provide the user with a tool that allows the user to track the resulting intensity changes in the image interactively. Such real-time visual feedback is key to enabling the user to quickly identify the boundaries of the regions of interest. A trained surgeon or a geophysicist may use such a tool with a remarkable degree of accuracy to demarcate the boundaries of an observed region of interest. From a usability point of view then, such a feature is an absolute requirement for ensuring good analysis of the dataset.

SUMMARY OF THE PRESENT INVENTION

A slice plane, oriented parallel to a viewing plane, is passed through a cuboidal dataset at regular intervals. The intersection of the slice plane with the cuboidal volume dataset results in primitives (quads, triangles, etc. depending on the angle and position of the intersection) whose vertices have position coordinates ($x_u$, $y_u$, $z_u$) and 3D-texture coordinates (r, s, t). The resulting primitives are rasterized using, for example, a traditional 3D graphics pipeline wherein the 3D-texture coordinates are interpolated across the scanlines producing 3D-texture coordinates for each fragment. The resulting 3D-texture coordinates for each fragment are stored in a 2D-texture storage area. These 2D-textures are called density-textures. The density textures are comprised of density values called "densels."

A rendering process according to the teachings of the present invention has, as its first step, the projection of the density-textures. That step is dependent upon the storage format. Rasterization of the primitives (quads and triangles resulting from the slice plane 38 intersecting the cube 32) happens in normalized-device space, at which point the vertices of the primitives have already been projected. If the storage of these density-textures occurs in normalized-device space, then projection is not necessary. However, if the storage is done in the original viewing space or even volume space, then the density-textures must be reprojected (i.e. retransformed to normalized-device space) before rendering.

Once the density-textures have been projected to normalized-device space, if necessary, then for each densel a color and opacity value is looked up in the texture-lookup table. A user-specified compositing function is used to blend the new color and opacity values with those in the framebuffer to arrive at the final result. The final result, i.e. the values in the framebuffer, is displayed.

The present invention is an algorithm that enables fast texture lookup updates to volume rendered datasets. The present invention accomplishes this using an efficient software data structure that reduces the burden on the available hardware resources thereby increasing efficiency and throughput. This feature is particularly valuable for a wide range of volume rendering applications. For example, the present invention will aid quick diagnosis in medical imaging applications, efficient seismic interpretation in geophysical applications, and even allow for fine tuning of rendering parameters to achieve artistic and emotional appeal in applications related to the creation of special effects, e.g. water, smoke, fire, etc. for entertainment applications. Those, and other advantages and benefits, will be apparent from the Description of the Preferred Embodiment appearing hereinbelow.

BRIEF DESCRIPTION OF THE DRAWINGS

For the present invention to be easily understood and readily practiced, the present invention will now be described, for purposes of illustration and not limitation, in conjunction with the following figures, wherein.

DESCRIPTION OF THE PREFERRED EMBODIMENTS

The present invention addresses the problem of interactive updates to texture lookup tables that are defined for volumetric datasets which in turn enables real-time updates to the rendered volumetric image. Volume datasets are scalar or vector density fields defined over a 3D grid. The individual scalar values at each grid point are called a voxel. As mentioned, volume datasets are available from many different sources such as medical scanners (MRI and CT), spectrum analyzers, laser stripe triangulators, and from various types of computations such as finite element analyses. By interactive and real-time updates I mean the update of the lookup table with a new set of color and opacity values that would result in a re-rendered volumetric image at rates that are fast enough for the user to perceive little or no lag between the inception of the update and the actual refresh of the rendered image.

The present invention will now be described in connection with an MRI apparatus 10 illustrated in FIG. 1. The reader will understand that the present invention is not limited to use in connection with the MRI apparatus 10 illustrated in FIG. 1. The use of the apparatus 10 is for purposes of illustration and to provide an example of a particular use for the present invention. A volumetric dataset produced by any of the aforementioned apparatus or methods may serve as input to the present invention.

Figure 1:
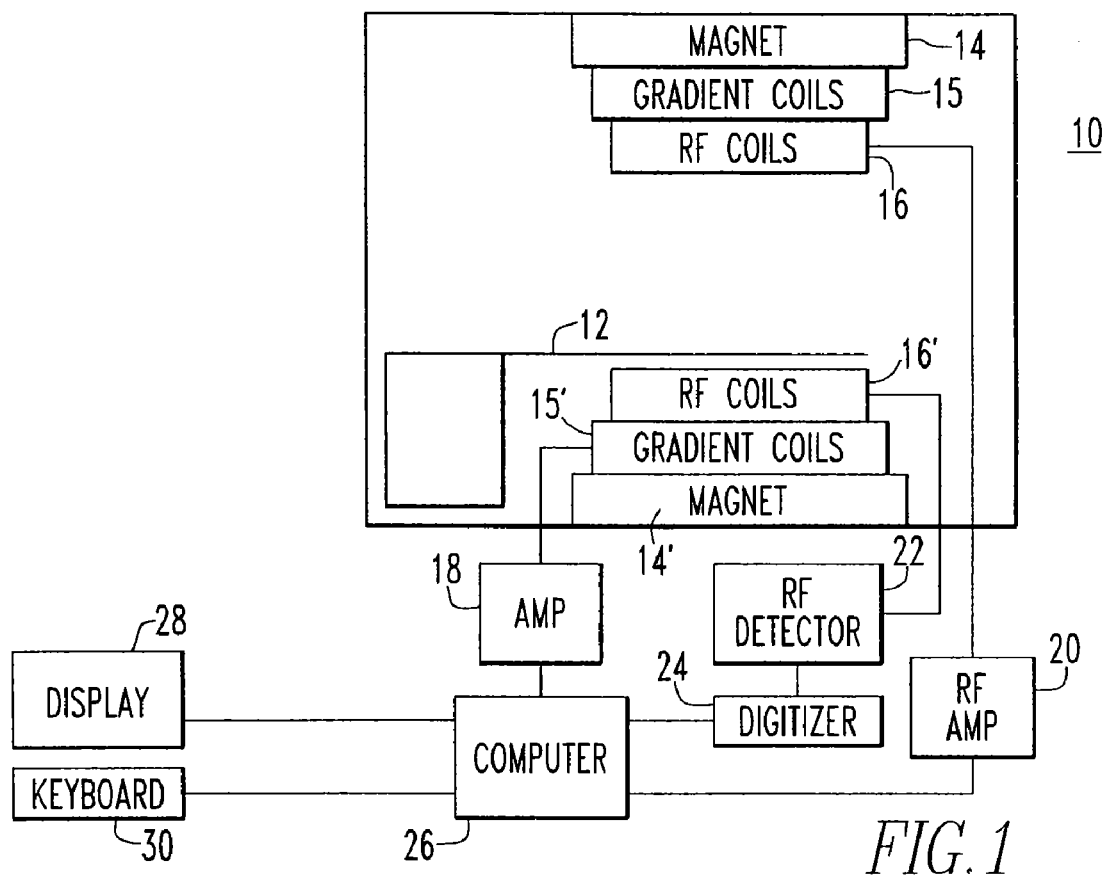
FIG. 1 illustrates a system in which a medical imaging device produces a volumetric dataset stored at a computer according to the present invention.

Turning now to FIG. 1., the MRI apparatus 10 is comprised of a movable patient table 12. The patient table 12 is capable of moving between upper and lower magnets 14, 14', upper and lower gradient coils 15, 15', and upper and lower radio frequency coils 16, 16', respectively. The gradient coils 15' are energized by an amplifier 18, while the RF coil 16 is energized by amplifier 20. A radio frequency detector 22 detects signals which are input to a digitizer 24. The digitizer 24 produces a volumetric dataset which is input to a computer 26. The computer 26 may be connected to a display 28, or other types of output devices not shown, as well as a keyboard 30, or other types of input devices not shown.

The computer 26 contains software for real-time rendering of images produced as a result of analysis of the volumetric dataset. Algorithms are known for rendering images from volumetric datasets. The computer 26 may also contain specialized hardware, often referred to as graphic accelerators, of a type suitable for the particular algorithm which the computer is programmed to process. The reader desiring more information about rendering algorithms and hardware architectures is referred to *Architectures for Real-Time Volume Rendering*, by Hans Peter Pfister, Elsevier PrePrint (7 Aug. 1998) which is hereby incorporated by reference.

A typical rendering algorithm is comprised of the following steps.

Rasterization—Rasterization is the conversion of geometric data into fragments; each fragment corresponds to a pixel in the framebuffer. This step involves scan converting a polygon whose vertices are mapped to the volumetric texture using 3D texture coordinates. During rasterization, the interpolated 3D texture values are mapped to unique positions in the 3D texture space. These form the sample points in texture space.

Trilinear interpolation—Trilinear Interpolation is a process whereby the densities at the sample points mentioned above are determined by interpolating the density values from the eight nearest neighbors.

Table lookups—The sampled density values from the trilinear interpolation step are used as pointers into a texture-lookup table, also called a transfer function lookup-table. The lookup table is an array of (r, g, b, α)-tuples that associates a single (r, g, b, α) value for each density value (densel). Here, α provides an indication of the opacity of the material at that point. The (r, g, b) values are used to visually differentiate the density values from one another to help in the classification process previously discussed.

Compositing—The resulting color and opacity values from the above step are then composited with the background color to yield the new color and opacity at that pixel. This step reflects the newly sampled point's contribution to the attenuation of the incoming light ray. The compositing operation represents the final step in the 3D rendering process.

Of these steps, the trilinear interpolation step is the most costly operation. The operation is not only computationally intensive, but also bandwidth intensive. To function, this operation needs the density values of the eight voxel values nearest to the sampled point. Memory access patterns of voxels for determining sample densities are random in nature. With volume datasets generally exceeding available data cache sizes, cache hit percentage drops, the available bandwidth on the bus is swamped with cache traffic and the process quickly saturates the bus.

My invention avoids that problem by moving the computationally intensive trilinear interpolation operation to a precomputation step. I take advantage of the fact that for a majority of applications in the volume rendering space, user interactions with the volume rendered dataset occur for fixed viewpoints. That allows me to precompute all the density values of the sample points and store them as density-textures. Now any user-defined texture lookup updates can be quickly visualized by processing the density-texture slices through the normal rendering pipeline and compositing the results. I have thus converted the volume rendering problem into a lower computational-cost based compositing problem.

Figure 3:
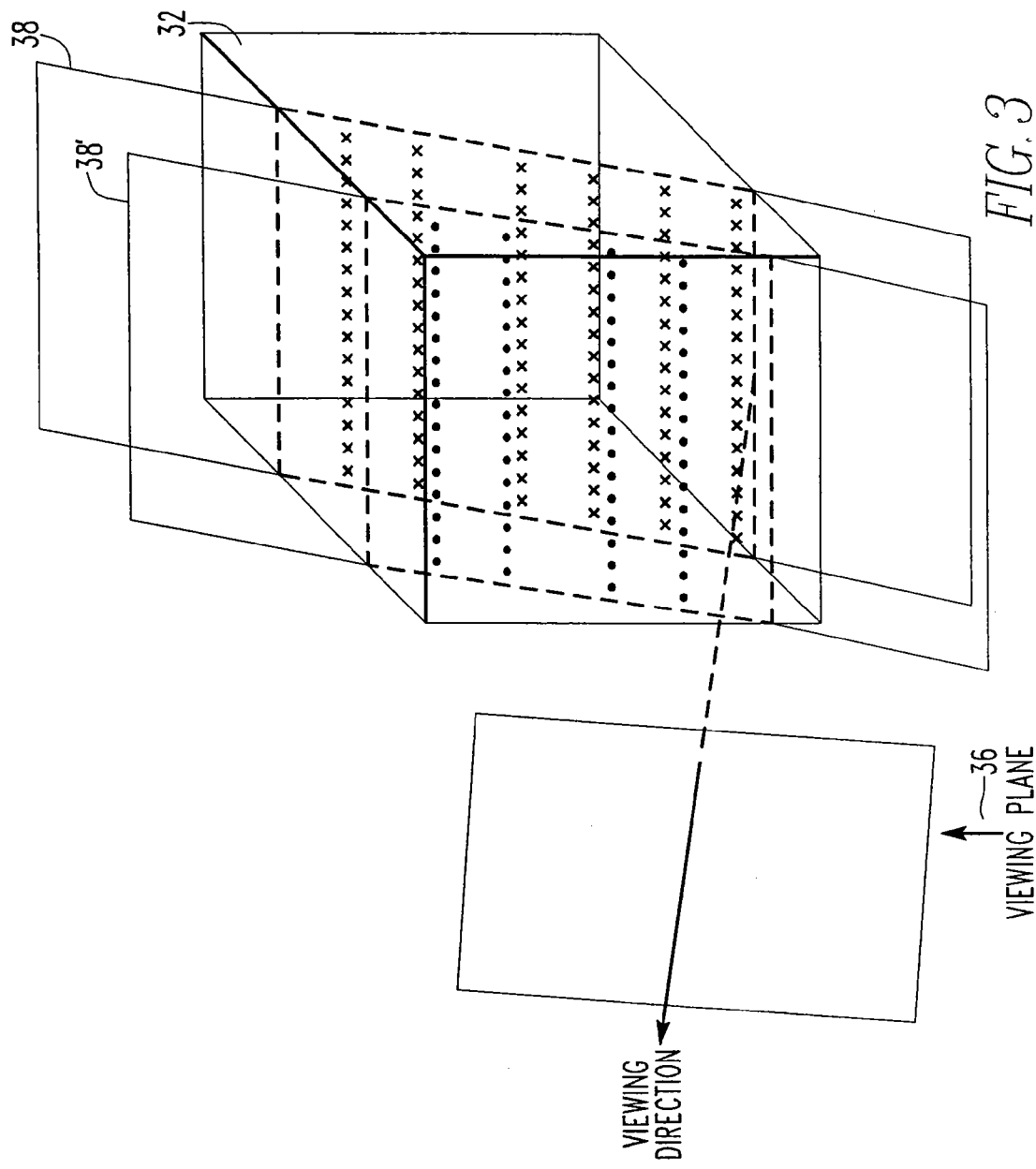
FIG. 3 illustrates the volumetric dataset as a cuboid which is sliced into planes parallel to the viewing plane for the purpose of generating the transformed dataset in accordance with the process of FIG. 2.
Figure 2:
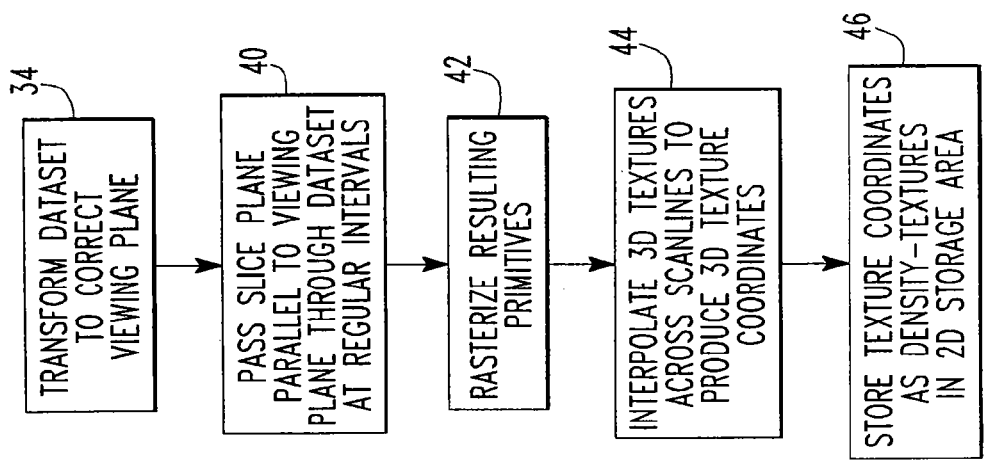
FIG. 2 is a block diagram of a portion of the process of the present invention in which a transformed volume dataset is produced by precomputing and storing density-textures for a fixed viewpoint.

My approach to real-time texture lookups is based on the following sequence of steps:

Creation and storage of density-textures (described in FIGS. 2 and 3).

Projecting density-textures (optional based on storage technique).

Figure 4:
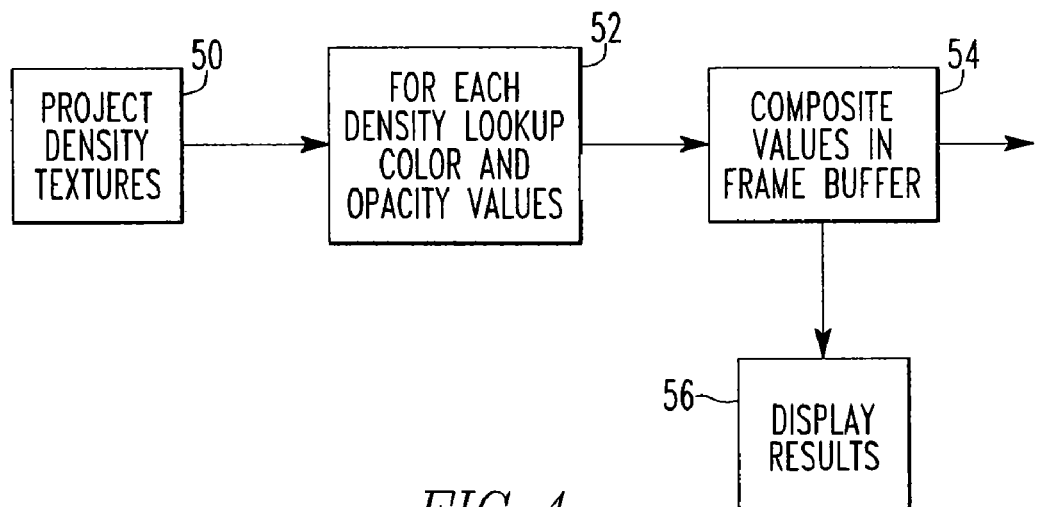
FIG. 4 is a block diagram of a volume rendering process in accordance with the present invention.

Lookup and compositing of density-textures (described in FIG. 4).

Before describing the present invention, I first establish the notation and terminology useful for understanding the present invention.

Voxel: The individual scalar values at each grid point.

Volume coordinates: The volumetric dataset is typically specified in its own native coordinate system as defined by the device that created the volume. I call this coordinate system the volume coordinate system V. Voxels are represented in their volume coordinate systems by their 3D volume coordinates (r, s, t).

Viewing coordinates: Volume datasets are rendered by first positioning them with respect to the eye or viewing coordinates through appropriate translations and rotations. These translations and rotations are jointly referred to as the modeling and viewing transformation in the manner of an OpenGL™3D rendering pipeline. The 3D viewing coordinates of a voxel or a vertex are represented by $(x_u, y_u, z_u)$.

3D Texture coordinates: The volume dataset is treated as a single block of solid texture with texture coordinates (u, v, w), such that $0 \leq u, v, w \leq 1$. Solid textures are also referred to as 3D-textures, because they have three texture coordinates. 3D-textures may be stored in a separate memory, called 3D-texture memory, slice by slice in row order.

3D Texture Assignment: The volume dataset is represented as a cube, defined by quads or triangles, with a total of eight vertices. If represented as quads we have a total of six quads each with four vertices, and if represented as triangles we have a total of twelve triangles. Each vertex in this representation is assigned unique 3D-texture coordinates that maps it to the appropriate position in 3D-texture space. The mapping is homeomorphic (meaning one-to-one and onto) and is aligned to correctly match the spatial and geometric orientation of the original volume. The texture coordinates of any given voxel in this volume can be easily derived by linear interpolation from the corner vertices. It should be noted that the texture coordinates of a vertex are invariant with respect to the viewing transformation.

Viewing Plane: A viewing plane is a plane onto which the volume is projected for final viewing. The projection may be an orthographic or perspective projection.

Slice Plane: A slice plane is a plane that is used to "slice" or intersect the cuboidal volume dataset. The resulting figure (quad, triangle or other primitive) defines the boundaries of the intersection of the slice plane with the cuboidal volume.

Feedback Mode: Many 3D Graphics API's, such as OpenGL, have a rendering mode called the feedback-mode. This is a mode wherein the primitives are transformed, clipped, lit and rasterized just as in the regular rendering mode, but with the difference that the outputs are not actually written out to the frame buffer. There are various options available whereby the outputs can be output to a software-buffer or even an off-screen buffer. The feedback-mode option is useful in creating the density-textures defined below.

Fragment: When the primitives are rasterized, their position and 3D-texture coordinates are interpolated across scanlines. Each interpolated value defines a position in normalized-device space with its own unique position and 3D-texture coordinate, and is referred to as a fragment.

Density textures: 2D slices of Voxel-density values computed by passing the slicing plane through the volumetric data set at an arbitrary user-defined viewing angle.

Densel: The values making up a density-texture.

Turning now to FIGS. 2 and 3, a cube 32 shown in FIG. 3 represents the volumetric dataset. The dataset 32 is transformed in step 34 of FIG. 2 through modeling and viewing transformations to correctly position it with respect to a viewing direction and a viewing plane 36 for an arbitrary viewing angle. A slice plane 38, 38', oriented parallel to the viewing plane, is passed through the cube 32 from back-to-front at regular intervals at step 40. The intersection of the slice plane 38, 38' with the view transformed cuboidal volume dataset 32 results in primitives (quads, triangles, etc. depending on the angle and position of the intersection) whose vertices have position coordinates $(x_u, y_u, z_u)$ and 3D-texture coordinates (r, s, t), each of which is determined during slicing (step 40) through linear interpolation from the corners of the cube.

The resulting primitives are then rasterized at step 42 using, for example, a traditional 3D graphics pipeline, wherein the 3D-texture coordinates are interpolated across the scanlines as shown in step 44. For each interpolated fragment, 3D-texture coordinates are generated. These 3D-texture coordinates define a unique density value in the 3D-texture through the homeomorphic mapping induced by the 3D-texture interpolation step. In normal immediate-mode rendering, the rendering process would translate this density value to a color and opacity value through a transfer-function lookup-table. However, rendering according to the present invention may be done in a feedback mode. The resulting 3D density coordinates for each fragment are stored in a 2D-texture storage area at step 46. The format of this 2D-texture storage will be dependent upon the rendering algorithm and the acceleration hardware. These 2D-textures are called density-textures. The reader desiring more information about the feedback mode is directed to the *Open GL Programming Guide*, by Neider et al., chapter 12, 1994, which is hereby incorporated by reference.

As a result of performing the aforementioned operations on the volume dataset, the computationally intensive trilinear interpolations have been performed. Depending upon the method of storage, the density-textures may now be used as pointers to values in a lookup table. Thus, the task of volume rendering has been transformed into a scanline interpolation and compositing problem which is not as computationally intensive as the original problem involving trilinear interploations.

A rendering process according to the teachings of the present invention is illustrated in FIG. 4. The first step, step 50, is the projection of the density-textures That step is dependent upon the storage format. Rasterization of the primitives (quads and triangles resulting from the slice plane 38 intersecting the cube 32) happens in normalized-device space, at which point the vertices of the primitives have already been projected. If the storage of these density-textures stores the values in normalized-device space, then projection is not necessary. However, if the storage is done in the original viewing space or even volume space, then the density-textures must be reprojected (i.e. retransformed to normalized-device space) before rendering.

Once the density-textures have been projected to normalized-device coordinate space, if necessary, then for each densel a texture lookup fetches the corresponding color and opacity values from the current lookup-table at step 52. A user-specified compositing function is used at step 54 to blend the values with those in the framebuffer to arrive at the final result. The final result, i.e. the values in the framebuffer, is displayed at step 56.

One of the advantages of the present invention is that it reduces the dependence on dedicated hardware for real-time interactions involving texture lookups. This reduced dependence on hardware allows for allocating spare cycles to other required computations, thereby making it easier to render texture lookup updates to volume rendered datasets at real-time rates. In addition, the present invention ensures that the bandwidth utilization for rendering texture lookup updates is reduced considerably. That has the effect of faster throughput for the rendering pipeline. The present invention allows for further bandwidth reduction by accommodating any available texture compression schemes in storing the precomputed values, leading to enhanced performance. Finally, because the present invention reduces the burden on the hardware, the present invention is more cost effective than a hardware based solution to the problem, while increasing the storage requirements moderately.

Volume rendering is an increasingly important application and one that will be an integral part of future graphics and visualization API's such as OpenGL and D3D. The present invention optimizes the bandwidth utilization in these applications and thereby increases the effectiveness of the memory architecture.

While the present invention has been described in conjunction with preferred embodiments thereof, those of ordinary skill in the art will recognize that many modifications and variations are possible. For example, the present invention may be used with many types of rendering algorithms and various types of graphics accelerators. All such modifications and variations are within the scope of the present invention.

What is claimed is:

1. An MRI apparatus, comprising:
a patient table;
upper and lower magnets positioned about said table;
upper and lower magnetic coils positioned about said table;
amplifiers for energizing said upper and lower magnetic coils;
a radio frequency detector;
a digitizer responsive to said radio frequency detector for producing a dataset; and
a computer having input and output devices connected thereto, said computer responsive to said digitizer, said computer programmed to operate on said dataset to perform a method comprising:
defining a plurality of slicing planes through the dataset, said slicing planes being parallel to a viewing plane;
interpolating density values in normalized device space for the figures generated by the intersection of the dataset with the slicing planes; and
storing the density values as density textures for later use.

2. The apparatus of claim 1 wherein said interpolating includes rasterizing the figures generated by the intersection of the dataset with the slicing planes.

3. The apparatus of claim 1 wherein said interpolating includes interpolating a density value by analyzing the density values assigned to a predetermined number of nearby points.

4. The apparatus of claim 1 wherein said method performed by said computer additionally comprises transforming the dataset to a new viewing plane.

5. An MRI apparatus, comprising:
a patient table;
upper and lower magnets positioned about said table;
upper and lower magnetic coils positioned about said table;
amplifiers for energizing said upper and lower magnetic coils;
a radio frequency detector;
a digitizer responsive to said radio frequency detector for producing a volumetric dataset; and
a computer having input and output devices connected thereto, said computer responsive to said digitizer, said computer programmed to operate on said volumetric dataset to perform a method comprising:
selecting a viewing plane;
slicing the dataset into a plurality of two dimensional slices, each slice resulting in a geometric primitive parallel to said viewing plane;
converting each primitive to a set of fragments each having its own three dimensional texture coordinate;
determining the density value of the three dimensional texture coordinate through interpolation from the nearest neighbors, and
storing the density values for later use.

6. The apparatus of claim 5 wherein said converting includes trilinear interpolation.

7. The apparatus of claim 5 wherein said method performed by said computer additionally comprises transforming the dataset to correspond to the viewing plane.

8. An MRI apparatus, comprising:
a patient table;
upper and lower magnets positioned about said table;
upper and lower magnetic coils positioned about said table;
amplifiers for energizing said upper and lower magnetic coils;
a radio frequency detector;
a digitizer responsive to said radio frequency detector for producing a 3D dataset; and
a computer having input and output devices connected thereto, said computer responsive to said digitizer, said computer programmed to operate on said 3D dataset to perform a preprocessing method comprising:
dividing the 3D dataset into a plurality of 2D primitives;
calculating density textures for each of said plurality of 2D primitives; and
storing said density textures for later use.

9. The apparatus of claim 8 wherein said calculating the density textures includes rasterizing said plurality of 2D primitives.

10. The apparatus of claim 8 wherein said calculating includes interpolating a value by analyzing the values assigned to a predetermined number of nearby points.

11. The apparatus of claim 8 wherein said method performed by said computer additionally comprises transforming the dataset to a new viewing plane.

12. An MRI apparatus, comprising:
a patient table;
upper and lower magnets positioned about said table;
upper and lower magnetic coils positioned about said table;
amplifiers for energizing said upper and lower magnetic coils;
a radio frequency detector;
a digitizer responsive to said radio frequency detector for producing a 3D volumetric dataset; and
a computer having input and output devices connected thereto, said computer responsive to said digitizer, said computer programmed to operate on said dataset to perform a method comprising:
defining a plurality of slicing planes through the dataset, said slicing planes being parallel to a viewing plane, the intersection of each of said slicing planes with said dataset producing a primitive;
rasterizing each of said plurality of primitives; and
storing the values produced by the rasterizing as density textures for later use.

13. The apparatus of claim 12 wherein said density textures are stored without transformation.

14. The apparatus of claim 12 wherein said method performed by said computer additionally comprises transforming the dataset to a new viewing plane.

15. An MRI apparatus, comprising:
a patient table;
upper and lower magnets positioned about said table;
upper and lower magnetic coils positioned about said table;
amplifiers for energizing said upper and lower magnetic coils;
a radio frequency detector;
a digitizer responsive to said radio frequency detector for producing a volumetric dataset; and
a computer having input and output devices connected thereto, said computer responsive to said digitizer, said computer programmed to operate on said dataset to perform a rendering method comprising:
retrieving information from a lookup table using a density-texture as a pointer to the information in the table indicating a contribution to an image;
compositing the retrieved information; and
displaying the composited information.

16. The apparatus of claim 15 wherein the information includes values for red, green, and blue and an opacity value.

17. An MRI apparatus, comprising:
a patient table;
upper and lower magnets positioned about said table;
upper and lower magnetic coils positioned about said table;
amplifiers for energizing said upper and lower magnetic coils;
a radio frequency detector;
a digitizer responsive to said radio frequency detector for producing a volumetric dataset; and
a computer having input and output devices connected thereto, said computer responsive to said digitizer, said computer programmed to operate on said dataset to perform a rendering method comprising:
using density texture values as pointers for retrieving information from a lookup table;
compositing the retrieved information; and
displaying the composited information.

18. The apparatus of claim 17 wherein said method performed by said computer additionally comprises transforming the density texture values into normalized-device space prior to using the density texture values as pointers.

19. The apparatus of claim 17 wherein the information includes values for red, green, and blue and an opacity value.

20. An MRI apparatus, comprising:
a patient table;
upper and lower magnets positioned about said table;
upper and lower magnetic coils positioned about said table;
amplifiers for energizing said upper and lower magnetic coils;
a radio frequency detector;
a digitizer responsive to said radio frequency detector for producing a volumetric dataset; and
a computer having input and output devices connected thereto, said computer responsive to said digitizer, said computer programmed to operate on said dataset to perform a rendering method comprising:
using a density-texture as a pointer to information in a lookup table; and
compositing the information from the lookup table.

21. The apparatus of claim 20 wherein the information includes values for red, green, and blue and an opacity value.

22. An MRI apparatus of the type comprising a patient table, upper and lower magnets positioned about said table, upper and lower magnetic coils positioned about said table, amplifiers for energizing said upper and lower magnetic coils, a radio frequency detector, a digitizer responsive to said radio frequency detector for producing a volumetric dataset, and a computer having input and output devices connected thereto, said computer responsive to said digitizer, said computer programmed to operate on said dataset to perform a rendering method, the improvement comprising:
said rendering method comprising instructions for using density textures generated and stored prior to said rendering.

23. An MRI apparatus, comprising:
a patient table;
upper and lower magnets positioned about said table;
upper and lower magnetic coils positioned about said table;
amplifiers for energizing said upper and lower magnetic coils;
a radio frequency detector;
a digitizer responsive to said radio frequency detector for producing a volumetric dataset; and
a computer having input and output devices connected thereto, said computer responsive to said digitizer, said computer programmed to operate on said dataset to perform a method comprising:
generating and storing density textures for said volumetric dataset prior to rendering said volumetric dataset.

* * * * *